No. 10,026. PATENTED SEPT. 20, 1853.
U. A. BOYDEN.
TURBINE.
4 SHEETS—SHEET 4.
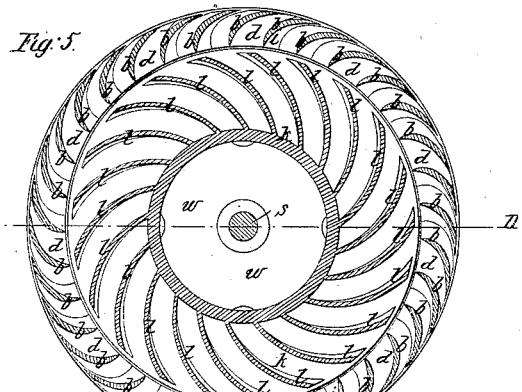
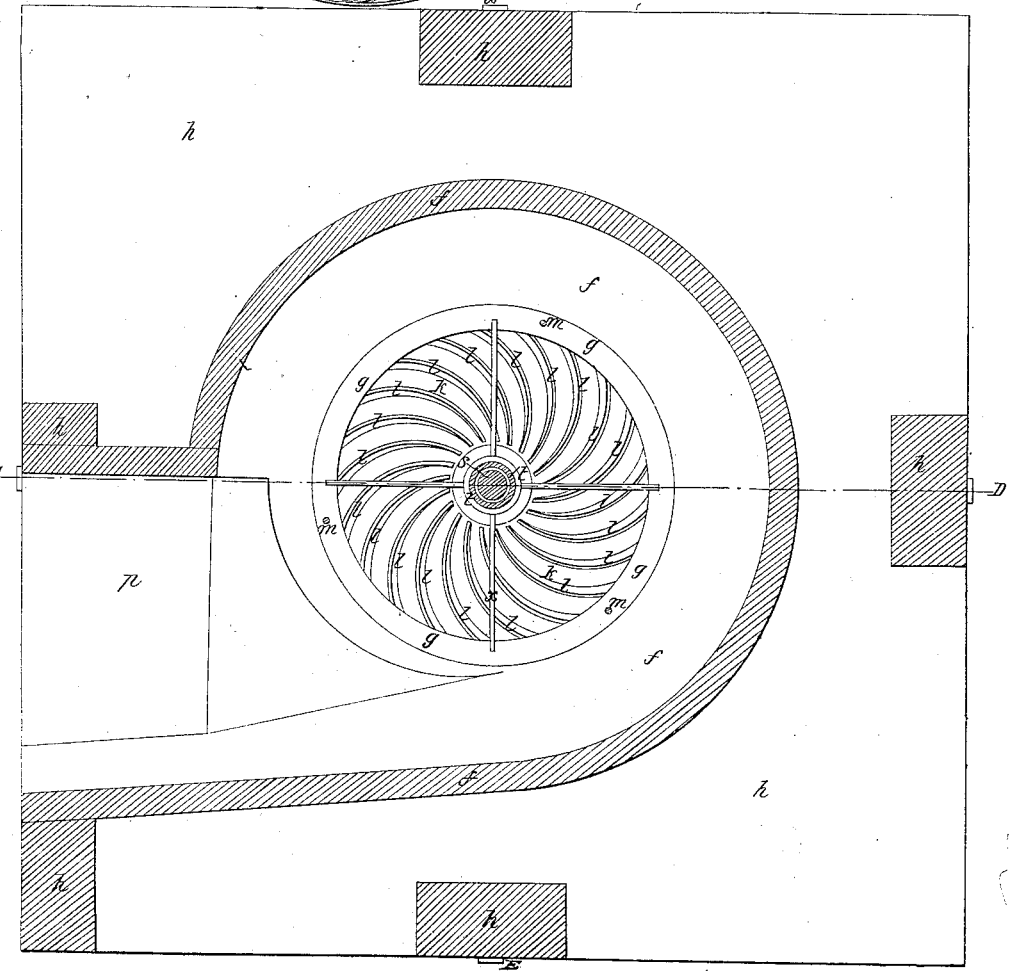

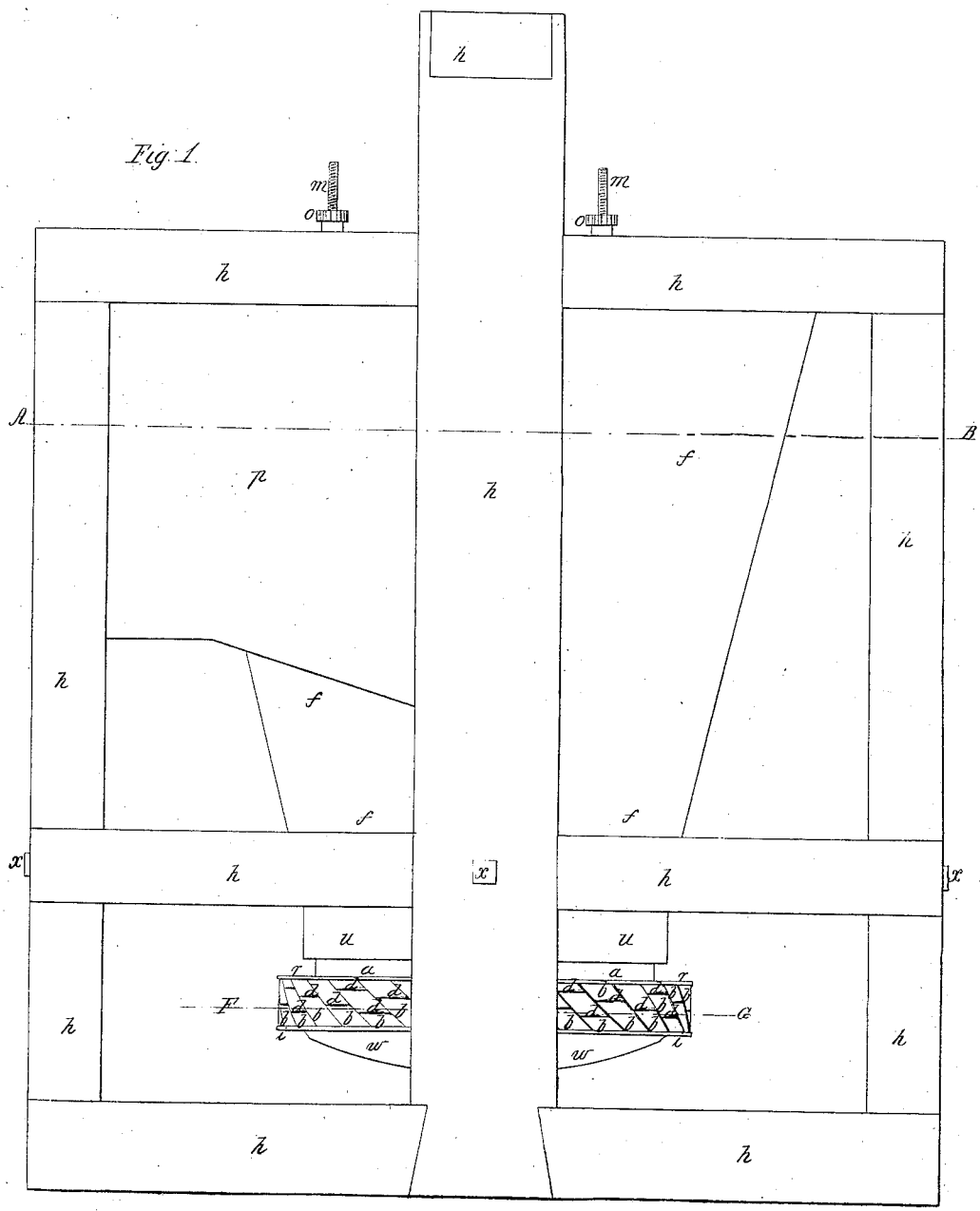

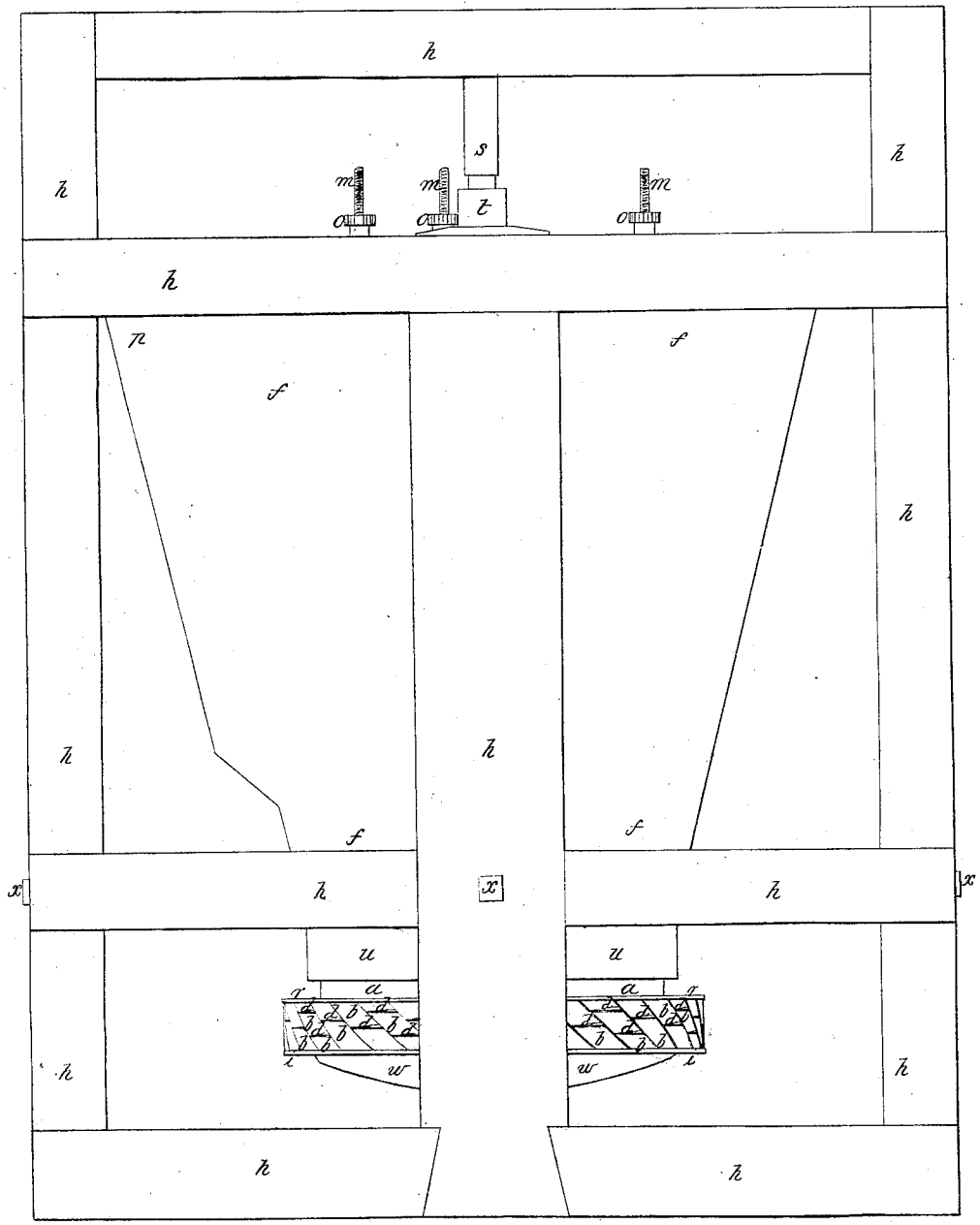

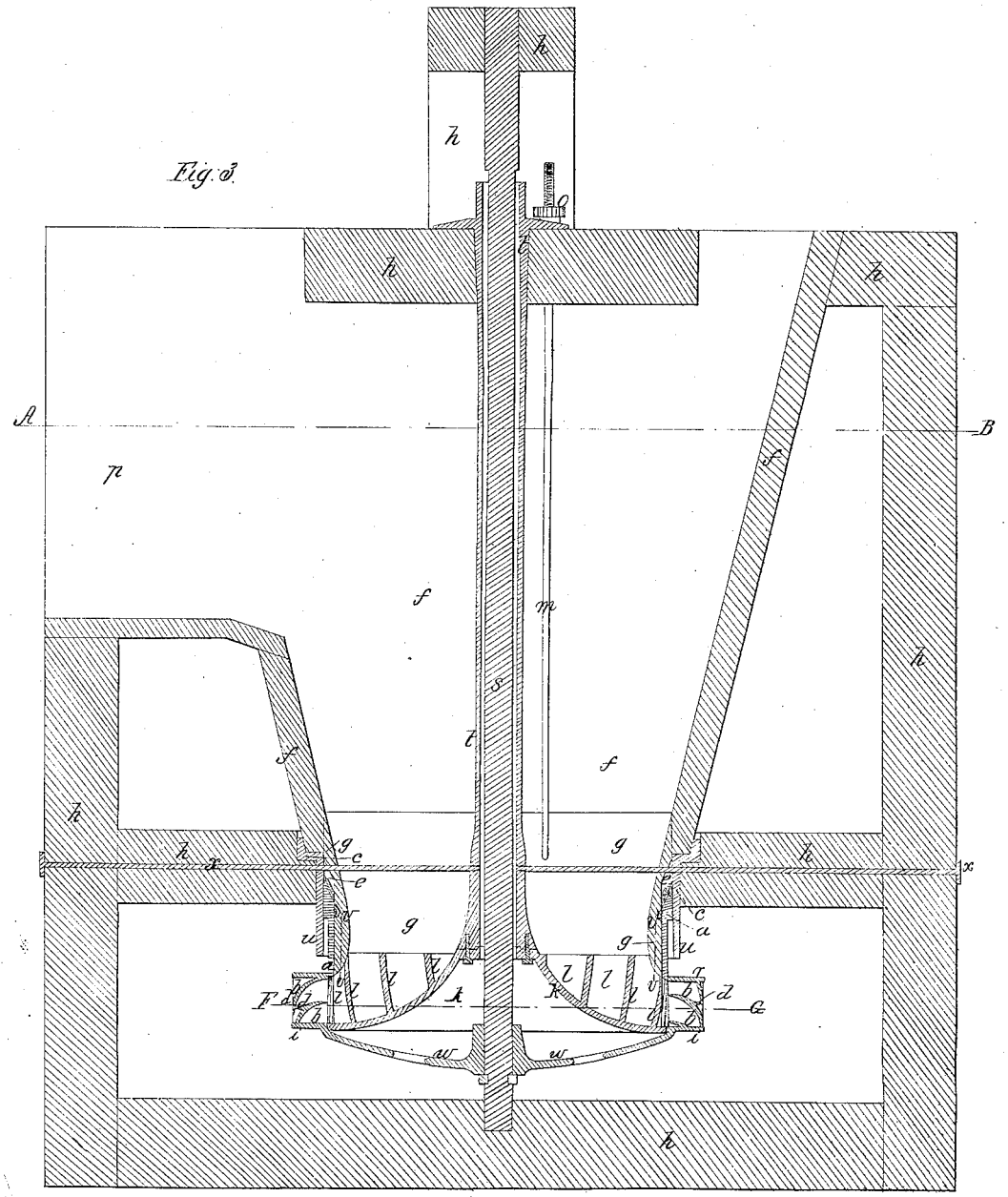

UNITED STATES PATENT OFFICE.

URIAH ATHERTON BOYDEN, OF BOSTON, MASSACHUSETTS.

IMPROVEMENT IN TURBINES.

Specification forming part of Letters Patent No. 10,026, dated September 20, 1853.

*To all whom it may concern:*

Be it known that I, URIAH ATHERTON BOYDEN, of Boston, in the county of Suffolk and State of Massachusetts, have invented new and useful Improvements in Turbines, whereby the efficiency of water in actuating them is increased and their inconvenience in use diminished; and I do hereby declare that the following is a true description thereof.

My invention consists, first, in so arranging the parts about the gate next the water-wheel as to prevent the motion of the gate from being often obstructed by dirt or sediment; secondly, in leaning the floats or inclining them to the rims of the wheel, so that when the wheel is working with the gate next the wheel partially open the leaning of the floats will diminish the spreading of the streams into the part of the wheel opposite the gate and prevent the loss of much of the force of the water by the spreading of the streams; thirdly, in placing the diaphragms or partitions in the wheel at different distances from the rims of the wheel in the several spaces between the floats, so as to facilitate regulating the motion of the wheel; fourthly, in combining the advantages of having the gate next the wheel move freely, with having all the water on entering the wheel when the gate is partially open move the way the wheel turns, by making the gate to move separately from garniture, and so leaning the guides which direct the water into the wheel that as the water runs by the side of the gate in approaching the smallest part of the passage into the wheel it will be directed the way the wheel turns by the leaning of said guides.

To enable others skilled in the art to make and use my invention, I will proceed to describe its construction and operation by explaining the annexed drawings, which make a part of this specification.

Figure 1 is an elevation of the turbine, the penstock, the flume, and the frame which supports them. Fig. 2 is an elevation of the side, which is on the right in Fig. 1, of the same things. Fig. 3 is a section of the same things, through and parallel with the axis of the water-wheel. Fig. 4 is a horizontal section of the same things. Fig. 5 is a horizontal section of the disk, leading curves, water-wheel, and its shaft.

The same small letters in all the figures refer to the same parts.

$h\,h$, &c., is the frame which sustains the penstock, flume, and turbine.

$p$ is the penstock.

$f\,f\,f\,f$ is the flume.

The turbine consists of the water-wheel $w\,w$, including its lower rim $i\,i$, its upper rim $r\,r$, its floats or buckets $b\,b$, &c., its diaphragms $d\,d$, &c., and several appendages, as the shaft $s$, the disk $k\,k$, the leading curves $l\,l$, &c., the annular gate $a\,a$, the three rods $m\,m\,m$ for moving the gate, the three pinion-nuts $o\,o\,o$ on the three rods $m\,m\,m$ for moving these rods and gate, the garniture or lining $g\,g\,g\,g$, the pipe $t\,t$ for sustaining the disk, the four rods $x\,x\,x\,x$ for holding the pipe $t\,t$, the curb $c\,c\,u\,u$, and some other parts not necessary to mention here.

In this kind of hydraulic motors, which are commonly called "turbines," the water acts on the floats chiefly by percussion, (though it should strike without shock or abruptness,) the water having a velocity equal to about seventy-five per cent. of that which is due to the whole fall when it first strikes the floats, though this depends in some degree on the gate being fully or only partially open, and its velocity gradually diminishes till it leaves the wheels or till near the time it leaves the wheels, which is an essential difference between them and simple reacting wheels, in which the water acts on the wheels rather by pressure and has its velocity increased as it passes through the wheels; and one essential difference between turbines and the class of tub-wheels and undershot wheels is that in the latter class the water does not act upon all the floats of the wheel at the same time, but the water flows upon the wheel only in one place in one stream, or it flows upon the wheel in several streams, with spaces between them, where it does not flow on the wheel, and the spaces between these streams are filled with air, the wheel not being submerged, or not working well if submerged, and the floats only receive blows from the water as they pass these streams, whereas in turbines and wheels of this class the water acts upon all the floats at the same time, or it generally acts upon some parts of the floats continually when the wheel is working if the gate be not moved, and it works best when submerged, though if there be only a small portion of the circuit of the wheel in which the water does not flow on the floats, the action of the water being chiefly the same as in turbines, I should call it an imperfect turbine.

Several divisions of my invention depend chiefly on the peculiarity of the operation of water in turbines or this kind of motors, and it is therefore necessary that this should be recollected to understand what follows relating to these parts of my invention.

In turbines as ordinarily made, in which the annular gate $a\ a$ is partially within the water-wheel, dirt or small substances are often carried by the water and by its pressure in the flume forcibly lodged between the leading curves $l\ l$, &c., Fig. 3, and the garniture $g\ g\ g\ g$, and at the packing $e\ e$ at the top of the annular gate $a\ a$ and obstruct the motion of the gate; and if the annular gate be outside of the water-wheel, so as to surround its upper rim, though the obstruction from dirt or small substances is partially avoided, there is a greater portion of the power of the water lost when the gate is partially open than there is when the gate is at the entrance for the water into the wheel and partially open, and there is a loss of water by its passing down between the disk $k\ k$ and the lower rim $i\ i$ when the gate is shut, which is avoided when the annular gate is at the entrance for the water into the wheel, and if the annular gate surrounds the upper part of the wheel and shuts on the lower rim of the wheel, which for such purpose would be made of larger diameter than the upper part of the wheel to receive the gate, there is an inconvenience of shutting the gate against the wheel while it is running, and if there be a stationary ring surrounding the lower rim of the wheel for the gate to shut on, instead of having the lower rim of large diameter for the gate to shut against, there is another loss of water when the gate is shut by its passing down between the circumference of the lower rim of the wheel and the ring for the gate to shut on. The first branch of my invention consists in avoiding these inconveniences by placing the gate at the entrance of the water into the wheel and making the upper part of the garniture $g\ g\ g\ g$ to fit the inner side of the flume $f\ f\ f\ f$, and so as not to be moved ordinarily in opening and closing the gate, or in producing substantially the same effects by having the garniture in pieces, the part over the gate and that toward the axis of the wheel being immovable and the part next the gate being attached to the gate, so as to move with it, the division being somewhat as represented by the red angular lines $v\ v\ v\ v\ v\ v$, Fig. 3, so that little or no water can flow to the top of the gate, excepting by the lower part of the garniture $g\ g\ g\ g$, and afterward upward, so that the water will not be liable to carry dirt or sediment to the upper part of the gate so as to obstruct its motion. The immovable part of the garniture so detached from the gate $a\ a$ serves to sustain the upper and outer parts of the leading curves $l\ l$, &c. These drawings represent the packing at the top of the gate as fitting the curb $c\ c\ u\ u$, which surrounds the upper part of the gate; but this packing may well fit the garniture $g\ g\ g\ g$ instead of fitting the curb without changing the form of the top of the gate, and the stationary garniture and upper part of the curb $c\ c$ may all be in one piece, and the part of the curb $u\ u$ below the top of the gate may be dispensed with and the motion of the gate remain so protected from interruption by dirt. Neither of these four branches of my invention are limited to such turbines as discharge the water at the peripheries of their wheels; but they are applicable to Poncelet turbines or hydraulic motors which have the water enter their wheels at their peripheries. The forms of this kind of motors which have the water enter their wheels at their peripheries are necessarily so different from those turbines which discharge the water at the peripheries of their wheels that I cannot make one set of drawings which will be well adapted to showing the application of all these improvements to both kinds. Therefore I refer to a patent for my improvements in hydraulic motors which is to be issued to me in September, A. D. 1853, from the Patent Office of the United States, for showing the adaptation of these improvements to such hydraulic motors as have the water enter their wheels at their peripheries.

The second branch of my invention consists in the floats or buckets $b\ b$, &c., leaning or inclining to the rims $i\ i$ and $r\ r$ of the wheel, as shown in Figs. 1, 2, and 5, so that when the wheel is working and the gate is partially open the parts of the floats which the water strikes immediately after passing the gate will be in advance or forward of the other parts of the floats, so that the inclining of the floats will diminish the spreading of the streams into the upper part of the wheel or into the part opposite the gate, or diminish the deflecting of the streams into this part of the wheel. It seems best to have the ends of the floats which the water first strikes make an angle of about forty degrees with the rims of the wheel; but the inclination may be considerably different and the inclining still answer the intended purpose nearly as well, and the curvature of the floats in any plane which is perpendicular to the axis of the wheel should be the same or very nearly the same as it should be if the floats were not leaning. In turbines as commonly made with vertical floats, when the gates are not open nearly the whole height of the wheels, a very large portion of the power of the water is lost by such spreading and deflection of the streams. As this advantage of inclination of the floats consists in preventing the streams from being so spread and deflected in the wheels, this inclination has no such effect in wheels in which the streams of water at all times when the wheels are working completely fill the wheels; and this branch of my invention consists in so inclining the floats in connection with a gate next the wheel or with other means of varying the width of the space or spaces or the number of them through which the water is admitted to the wheel.

To avoid the spreading of the streams of water in the wheels of turbines, they are in some instances made with partitions or diaphragms *d d,* &c., Figs. 1, 2, 3, and 5, between the floats and parallel with the rims of the wheel. These diaphragms as commonly made are at the same distances from the rims of the wheel in each of the spaces between the floats. There are in some instances more than one diaphragm in each space between two floats, and the several diaphragms are at the same distances from the rims of the wheel in all the spaces between the floats in turbines formerly made. With wheels so made, when the gate is opened to such a width as to have one of its edges opposite a diaphragm, by opening the gate only a little wider, so that the water will pass into the wheel on both sides of the diaphragm, the small additional stream which is thus admitted on one side of the diaphragm spreads much in the wheel, and as this small stream spreads the velocity of the water in it diminishes till it becomes so slow that the float strikes it, and because the outlet for such small streams at the periphery of the wheel is many times greater than the passage by which it flows into this space in the wheel that part of the velocity of this water, which is from the axis of the wheel, when it leaves the wheel is only a small fraction of the velocity which it had from the axis of the wheel when it entered the wheel. Hence this water in passing through the wheel is deflected to nearer the way the wheel turns, so that it moves very nearly the same way as that part of the wheel next it and with very nearly the same velocity when it passes out of the wheel. Hence when it leaves the wheel the part of its velocity which is the way the wheel turns is greater than that which it had the way the wheel turns at the time it entered the wheel, and consequently a part of the force of the wheel is expended in increasing this water's velocity the way the wheel turns, and, hence, the velocity of the wheel is diminished by so opening the gate as to admit this water, though by opening the gate much wider the velocity of the wheel is increased. Hence it is very difficult to regulate accurately the motions of such a wheel by moving said gate next the wheel. The third branch of my invention consists in placing these diaphragms at different heights in the different spaces, as shown at *d d,* &c., Figs. 1 and 2, so that they will not be of the same height or at the same distances from the rims of the wheel in one space as in those next on either side. Hence when the gate is open such a width as to admit only a small stream on one side of a diaphragm in some of the spaces between the floats, in some other spaces the streams will be so large as to nearly or quite fill the spaces between two diaphragms or between the diaphragms and one of the rims. With wheels which have the diaphragms so arranged the power of the wheel is always increased by opening the gate and using more water, or the power is always diminished by shutting the gate in the least degree, so as to diminish the expenditure of water. Hence when the diaphragms are so arranged said difficulty of regulating the motion of the wheel accurately is avoided.

It is best to have the height of the diaphragms the same on opposite sides of the wheel, so that the water will act on any two sides of the wheel which are on opposite sides of its axis with the same or nearly the same force, whatever be the height of the gate, otherwise the greater action of the water on one side of the wheel than on the opposite may cause one side of the shaft of the wheel to be pressed against its bearing next the wheel more forcibly than the other and wear it so that the wheel will wabble. This arrangement of said diaphragms will facilitate regulating the motions of wheels when the gates are at the outlets of the water from the wheels, instead of being, as represented by these drawings, at the inlet. This third branch of my invention is applicable to reacting-wheels with which there are no guides, as *l l,* &c., to direct the water the way the wheel turns.

If the garniture *g g g g,* Figs 3 and 4, be attached to the gate, so as to move with it, its motion is liable to be obstructed by substances lodging between it and the guides or leading curves *l l,* &c., Figs. 3, 4, and 5, and if the garniture be immovable and the leading curves be vertical, as usual, when the bottom of the gate is much below the bottom of the garniture, as it must be when the gate is partially open, or if there is no garniture, some of the water descends nearly parallel with the axis of the water-wheel by the inner surface of the gate and changes its direction as it passes under the gate, so as to move nearly directly from the axis of the wheel when it enters the spaces between the floats, the leading curves having scarcely any effect in causing this portion of the water to move the way the wheel turns, so that its velocity the way the wheel turns is less than the working velocity of the parts of the wheel where the water enters it, and consequently the wheel strikes it and the motion of the wheel is obstructed by this water which passes next the gate, and other portions of the water which pass rather farther from the gate move nearer the right way when they enter the wheel, but still so far from the right way that some of their force is lost from this cause. The fourth branch of my invention consists in partially avoiding these inconveniences by making the gate to move separately from the chief or any garniture, combined with leaning or inclining guides, as shown in Figs. 3, 4, and 5, so that as the water descends in contact with or near the inner surface of the gate, in approaching the passage under the gate, the leaning of these guides causes the water to incline the way the wheel turns, though that part of the water which does not pass near the gate and moves horizontally on entering the wheel moves in the same direction which it would if these guides did not lean. The degree of this leaning should depend in some measure on the direction which the water has when it first passes between these guides, because the more nearly their directions coincide with the motion of the water when it first passes between them the smaller will be that portion of its force which will be lost by shocks and eddies at their upper edges. If there be nothing to give the water a gyratory motion before it passes between them, their outer ends next the wheel should lean about thirteen degrees—that is, make an angle of about seventy-seven degrees with the plane of the wheel; but if the form of the flume be such as to give the water a gyratory motion before it passes between the guides they may lean about eighteen degrees. It is well to make the gates about thirty per cent. thicker than it should be when the garniture is attached to it, and to round its lower edge a little.

This improvement is quite applicable to such turbines or hydraulic motors as have the water enter their wheels at their circumferences, as that which is to be described in a patent for my "improvements in hydraulic motors," which is to be issued to me in September, A. D. 1853, from the Patent Office of the United States. With such motors as have the water enter their wheels at their circumferences the degree of leaning of the guides should greatly exceed that mentioned above for those which discharge at their peripheries, because by leaning the guides much in those which discharge at the peripheries of the wheels the passage between these guides become so small as not to admit sufficiently large quantities of water to flow into the wheels freely; but with those in which the water runs the opposite way the guides may lean much more, so as to derive more benefit from the leaning and still have ample ways for the water to flow into the wheels, and because the water has less velocity when it first passes between the guides, this leaning does not depend so much on any gyratory motion of the water when it first passes between the guides as in those turbines which discharge the water at the peripheries of the wheels. With those which have the water enter the wheels at their peripheries this leaning of the guides may be three or four horizontal to one in height for their inner ends next the wheel, and they should be twisted or warped so that their parts at all heights will make the same or nearly equal angles with the parts of the periphery of the wheel next these parts, respectively, so that when the gate is fully open these guides will cause the water to enter the wheel with the same or nearly the same inclination to the wheel at all points at which it enters the wheel. Generally, in motors which have the water enter their wheels at their peripheries, with the guides leaning as much as three horizontal to one in height, the number of guides for a wheel should be rather less than there might be if the guides were vertical, because otherwise the spaces between them would be so narrow that they would be liable to be choked by substances carried by the water in the majority of places where used.

What I claim as my invention is—

1. The arrangement of a gate at the entrance for the water into the wheel, with a part or all of the garniture or lining and other parts of the turbine within, over, and about the gate such that the gate and a part of the garniture, if any be attached to it, may move freely, while the part of the garniture not attached to the gate and other parts over and about the gate remain stationary, and so closely fitted that little or none of the water in the flume can run to the upper part of the gate, excepting by passing under the stationary garniture and afterward upward, so as to diminish the liability of sediment, dirt, or other substances being carried by the water to the upper part of the gate or movable part of the garniture, if any be attached to the gate, so as to obstruct the motion of the gate or movable part of the garniture, essentially as above described.

2. The leaning or inclining of the floats or buckets of turbines to the rims of the wheels so that when the wheel of a turbine is working with the gate next the wheel partially open the parts of the floats opposite the aperture formed by such partial opening of the gate will be forward of those parts next the other rim of the wheel, so that the leaning of the floats will diminish the spreading or deflecting of the streams into the part of the wheel opposite the gate, essentially as above described, though I do not limit my claim to any degree of inclination, but extend it to all degrees or inclinations which will substantially answer the same purpose. As this effect of inclining the floats depends on the streams only partially filling the wheel, I do not extend my claim to inclining the floats to any such turbine or hydraulic motor as has no gate at or near the water-wheel or other means of varying the width, thickness, or number of streams which enter the wheel.

3. The arrangement of the diaphragms or partitions in reacting wheels and in wheels of turbines at different distances from the rims of the wheels in the several spaces between the floats to facilitate regulating the motions of the wheels, essentially as above described, though I do not limit my claim to any particular arrangement as to the distances of these diaphragms from the rims of the wheels, but extend it to all arrangements which operate substantially as above described; but as the effect of these diaphragms depends on the streams only partially filling the wheels I do not extend my claim to this arrangement of the diaphragms to such motors as have no gate next or near the water-wheels or other means of varying the width, thickness, or number of streams which enter the wheels.

4. The combination of the device of making the gate at the entrance for the water into the wheel to move separately from the garniture, with leaning the guides or leading curves which direct the water into the wheel, so that when the gate is partially open the part of the water which passes by or near the surface of the gate in flowing toward the passage into the wheel made by such partial opening of the gate has its motion directed the way the wheel turns in consequence of the leaning of the said guides. I do not confine my claim exactly to any degree of leaning, but extend it to all degrees of leaning which will essentially answer the same purpose.

I do not limit either of these four branches of my claim to such turbines or hydraulic motors as discharge the water at their peripheries; but I extend them to such as have the water enter their wheels at their peripheries.

URIAH ATHERTON BOYDEN.

Witnesses:
SAML. GRUBB,
S. W. GRUBB.